Patented July 8, 1952

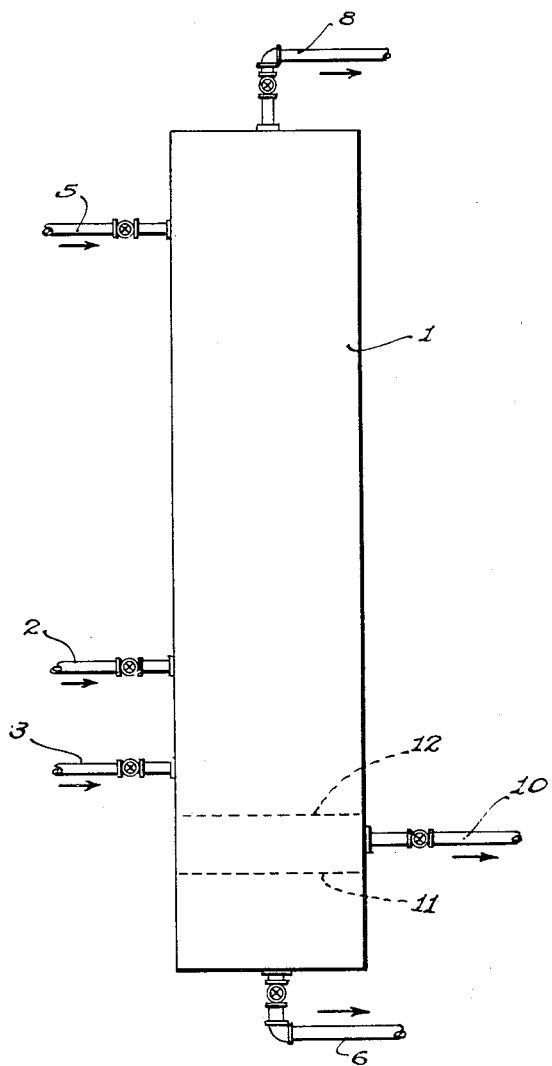

2,602,808

UNITED STATES PATENT OFFICE 2,602,808

MANUFACTURE OF FATTY ACIDS

Felix E. Lacey and William M. Leaders, Chicago, Ill., assignors to Swift & Company, Chicago, Ill., a corporation of Illinois Application December 8, 1945, Serial No. 633,805

9 Claims. (Cl. 260—415)

This invention relates to the manufacture of fatty acids and has to do particularly with the manufacture of light colored fatty acids by the continuous splitting of fats.

In the continuous splitting of fats into fatty acids it is customary to treat the fats with water in a counter-current tower under high temperature and pressure conditions. Such a process is applicable to the treatment of fats generally, but the quality of the fatty acids is somewhat dependent on the nature of the charging stock. For example, when using high grade fats as charging stock a good quality of fatty acid is obtained, whereas when using a relatively low grade of charging stock the resultant fatty acids usually require further treatment in order to secure high grade fatty acids. Thus, in splitting fats of light color there may be some loss in color but the quality of the finished product may be sufficiently good to meet the requirements of commercial grades of fatty acids. However, in treating dark fats it is usually necessary to subject the fatty acids to further processing such as bleaching, distillation, etc., to separate the undesirable constituents. Such further treatment is expensive, requires additional equipment, and causes appreciable loss and reduction in product yield.

An object of the present invention is to provide a simple and efficient method of producing high grade fatty acids from any type of fats.

Another object of the invention is to provide a continuous fat splitting operation which produces increased yields of light colored fatty acids.

A further object of the invention is to split fats in a continuous process wherein decolorization of the fatty acids is obtained.

A still further object of the invention is to provide a process for splitting fats in the presence of a refining solvent whereby the fat is split and the products refined in a single operation.

Also an object of the invention is to provide an improved process for the continuous splitting of fatty acids in the presence of water wherein a smaller amount of water is required and a more concentrated sweet water is obtained.

Another object of the invention is to provide a process for counter-current splitting of fats with water wherein the separation of glycerine resulting from the hydrolysis is facilitated.

In the customary method of counter-current splitting of fatty acids the fat is introduced into the lower portion of a vertical tower and the water is introduced into the upper portion of the same tower so that the fat and water pass counter-current while maintaining temperature and pressure conditions such that the fat is hydrolyzed into fatty acids and glycerine. A portion of the water at the operating conditions dissolves in the fat to provide water for the hydrolysis. An excess of undissolved water is used and such excess water washes the glycerine from the fat so that the glycerine is removed from the zone of reaction and promotes the hydrolysis reaction. The resulting fatty acids are withdrawn from the top of the tower and the glycerine fraction or sweet water is withdrawn from the bottom of the tower. The temperature and pressure conditions used in such a process are ordinarily about 350° F. to 600° F. and pressures sufficiently high to maintain the water in the liquid phase. Such a process is more fully described in the Ittner Patent Re. 22,006, January 13, 1942, and the Mills Patent 2,156,863, May 2, 1939.

In accordance with the present invention the fat is subjected to treatment with water under hydrolyzing conditions of temperature and pressure in the presence of a suitable inert organic diluent or solvent, which remains substantially in the liquid phase under the operating conditions. We have found that the process may be operated in a manner such that the solvent causes substantial separation of color and other undesirable bodies which normally would be retained in the fatty acids. Ordinarily the process is operated under conditions to form a three phase system comprising a layer relatively rich in light color fatty acids and solvent, a layer relatively rich in foots and solvent, and a layer of sweet water.

In the broader aspects of the invention it is intended that the process of the present invention may be operated with a non-polar solvent which may be immiscible or be partially or completely miscible with the fatty material. We prefer a solvent which causes a separation of phases and extraction or decolorization of the fat or fatty acids under fat splitting conditions of temperature and pressure. Among the solvents which are contemplated the following may be mentioned: hydrocarbon solvents such as normal and iso pentanes, normal and iso hexanes, petroleum naphtha. The critical temperatures of such solvents are at least fat splitting temperatures.

According to the invention relatively low boiling hydrocarbons such as normal and iso pentane, normal and iso hexanes and normal and iso heptanes, etc., may be used. In this modification the solvent is preferably one which forms two liquid layers at high temperatures such as in the region of the critical conditions of the solvent. For example, many of the aforesaid solvents may at ordinary temperatures dissolve completely the fatty materials but at elevated temperatures form two layers, an upper layer containing the light colored fatty materials and a lower layer containing the dark colored fatty material or foots.

In practicing the invention the process may be operated batch, semi-batch or continuous. It is preferred to operate counter-currently and any well known or preferred continuous counter-current system such as a counter-current tower, a multiple stage counter-current system or one or more stages of batch treatment may be used. The best results are obtained by using a counter-current tower.

The operating conditions will vary somewhat depending on the material treated and the solvent used. In general temperatures as nearly those which are conducive to rapid fat splitting are employed. These temperatures may range from between about 300° F. to 600° F. Best results are obtained when operating in the region of about 400° F. to 500° F. The temperatures and pressures will vary with the solvent as it is necessary to operate under the critical conditions to retain the solvent in the liquid phase. The pressure will depend of course on the temperature but usually pressures not in excess of about 800 pounds are necessary and usually pressures of 250 pounds to 600 pounds are sufficient.

The invention will be more fully understood from the following description read in connection with the accompanying drawing which shows one form of apparatus for carrying out the process of the invention.

Referring to the drawing the numeral 1 represents a vertical counter-current tower which may be similar to that used in conventional fat splitting operations. Such towers are usually relatively high in proportion to the diameter and should be sufficiently tall to provide for the necessary time of reaction. The fat is introduced into the lower through the line 2 usually at the lower portion of the tower and is preferably introduced between the entrance points of the water and solvent. The solvent is introduced in the lower portion of the tower through the line 3 and preferably below the entrance point of the fat. While separate lines are shown for introducing the fat and solvent it is contemplated that the fat and solvent may be mixed before introduction into the tower. It is preferable to introduce the fat and solvent as indicated in the drawing in order to secure better counter-current action between the fat and solvent. The water is introduced into the upper portion of the tower through the line 5 and passes downwardly through the tower counter-current to the fat and solvent. A substantial amount of the water dissolves in the fat solution which provides better contact and promotes the hydrolysis reaction. A substantial excess of water over that which dissolves in the fat is employed to wash the glycerine from the mixture and thereby remove the glycerine from the zone of reaction whereby the hydrolysis reaction is promoted. The water in passing downwardly through the tower washes out the glycerine and the glycerine or sweet water accumulates in the lower portion of the tower from which such sweet water may be withdrawn through the line 6. The conditions are maintained whereby two layers of the solvent fat solution are obtained. The upper layer containing fatty acids and unhydrolyzed fat collect in the upper portion of the tower the concentration of the fatty acids increasing toward the top of the tower. Relatively pure light colored fatty acids and solvent are withdrawn from the top of the tower through the line 8. A lower layer of solvent and foots collect in an intermediate portion of the tower and may be withdrawn through the line 10. The interface between the sweet water and the solvent solutions is indicated at 11 although the exact position of this interface may vary depending on the accumulation of aqueous materials in the lower portion of the tower. The interface between the two solvent layers is indicated at 12 although the position of this interface may vary considerably. When using a hydrocarbon solvent which forms two phases around the critical conditions the position of the interface may be about that indicated in the drawing. When using an extraction or polar solvent the interface may be considerably higher in the tower and may be between the point of introduction of the solvent and fat or even between the point of introduction of the fat and water.

The temperature in the tower 1 may be maintained by preheating the water, fat and solvent to approximately the fat splitting temperatures before introducing them into the tower, or the temperature in the tower may be maintained by supplying heat to the tower by heating elements such as electrical heating elements or steam coils or by the direct injection of super-heated steam. We prefer to operate by direct injection of super-heated steam and this may be done by injecting the steam at any one or more of the following points: the top, the bottom, or the mid-section of the tower.

As an example of the operation of the invention a sample of brown grease having about 37 titer, darker than 45 F. A. C. color and about 38% free fatty acid was introduced into the lower portion of the fat splitting tower at a temperature of about 150° F. The water was introduced into the upper portion of the tower also at about 150° F. The proportion of fat to water was around 5 to 3. Normal heptane was introduced into the lower portion of the tower at a substantial distance below the point of introduction of the fat. The temperature of the normal heptane was about 150° F. and the ratio of solvent to fat was approximately 15 to 1. The tower was maintained at an internal temperature of about 480° F. by direct injection of super-heated steam at a plurality of points along substantially the length of the tower. The pressure in the tower was maintained at around 600 pounds. Light colored fatty acids and solvents were drawn off from the top of the tower at a temperature of about 220° F. Sweet water was drawn from the bottom of the tower also at about 220° F. The concentration of glycerine in the sweet water was about 10%. The fat solvent layer above the glycerine water formed two phases, the lower phase comprising a foots fraction which was drawn off as a side stream from the lower portion of the tower. The amount of splitting of the fats was about 98%. The foots was a dark colored viscous liquid containing pitch and other color bodies and a small percentage of fatty material dissolved in a small amount of the solvent. The fatty acids were light colored having a 3 F. A. C. color after flashing off the solvent.

The present invention has the advantage of producing a high quality of fatty acids particularly as to color, stability and a high degree of purity. The process of the present invention also produces a desirable split of fats and requires less equipment than normally is required to separately split fats and then refine the products. The solvent tends to facilitate the separation of the glycerine whereby the splitting reaction is accelerated.

Obviously, many modifications and variations of the invention specifically described herein may

We claim:

1. A continuous process for hydrolyzing fats into fatty acids and glycerine which comprises continuously subjecting the fats to hydrolyzing temperatures in the presence of water whereby the fats are hydrolyzed into fatty acids and glycerine, continuously subjecting the fats to the action of a solvent selected from the group consisting of normal pentane, iso pentane, normal hexane, iso hexane, normal heptane, iso heptane, and petroleum naphtha during said hydrolysis operation to produce refined fatty acids, the temperature and pressure of said hydrolysis operation being sufficiently high to maintain the water and solvent in the liquid phase, maintaining the ratio of solvent to fats such that the resulting mixture separates into a plurality of phases, one of said phases containing solvent and light color fatty acids and another of said phases containing solvent and color bodies, and separating the phase containing the color bodies from the phase containing the light color fatty acids.

2. A continuous process for hydrolyzing fats into fatty acids and glycerine which comprises subjecting a stream of the fats to hydrolyzing temperatures and pressures in a fat splitting zone in the presence of water and in the presence of a solvent selected from the group consisting of normal pentane, iso pentane, normal hexane, iso hexane, normal heptane, iso heptane, and petroleum naphtha whereby the fats are hydrolyzed into fatty acids and glycerine which form separate phases, said temperatures and pressures being sufficiently high to maintain the water and solvent in the liquid phase, maintaining the ratio of solvent to fats and fatty acids such that the solution of the fats and fatty acids separates into two phases, one of said phases being rich in light color fatty acids and the other of said phases being rich in impurities, and continuously separating said phases.

3. A continuous process for the manufacture of fatty acids from fats which comprises passing the fats counter-current to a solvent selected from the group consisting of normal pentane, iso pentane, normal hexane, iso hexane, normal heptane, iso heptane, and petroleum naphtha, adding sufficient water thereto to hydrolyze the fats into fatty acids and glycerine, subjecting the products to temperatures sufficiently high to hydrolyze the fats and to pressures sufficiently high to maintain the water and solvent substantially in the liquid phase, maintaining the ratio of solvent to fats and fatty acids whereby two liquid phases are formed, one of said phases containing refined fatty acids and the other of said phases containing impurities, separating the phases and recovering therefrom the fatty acid and glycerine.

4. A continuous process for the manufacture of fatty acids which comprises introducing water into the upper portion of a fat splitting zone, introducing into the lower portion of said zone fats and a solvent selected from the group consisting of normal pentane, iso pentane, normal hexane, iso hexane, normal heptane, iso heptane, and petroleum naphtha subjecting the products in said zone to hyrolyzing temperatures and pressures sufficiently high to maintain the water and solvent in the liquid phase whereby a refined fatty acid fraction collects in the upper portion of said zone, a sweet water in the lower portion of said zone, and a fraction containing impurities in an intermediate portion of said zone, withdrawing said fractions from said zone and recovering fatty acids and glycerine therefrom.

5. A process for the manufacture of fatty acids from fat which comprises passing the fat counter-current to a solvent selected from the group consisting of normal pentane, iso pentane, normal hexane, iso hexane, normal heptane, iso heptane, and petroleum naphtha whereby the fats and solvent form two liquid phases, one of said phases being rich in refined fats and the other of said phases being rich in impurities, adding sufficient water thereto to hydrolyze the fats into fatty acids and glycerine and enough additional water to wash out the glycerine and form a separate phase of sweet water, maintaining the hydrolyzing temperatures and pressures sufficiently high to keep said water and solvent in the liquid phase whereby the fats are hydrolyzed to fatty acids and glycerine, and separating out said phase containing the impurities and the phase containing the sweet water.

6. A continuous process for the manufacture of fatty acids from fat which comprises passing a stream of fat countercurrent to a stream of a solvent selected from the group consisting of normal pentane, iso pentane, normal hexane, iso hexane, normal heptane, iso heptane, and petroleum naphtha whereby two liquid phases are formed, one of said phases being rich in impurities, adding water thereto in sufficient amount to hydrolyze the fats to light color fatty acids and to wash the glycerine from the hydrolyzed products, maintaining the reaction products under pressure and temperature conditions to hydrolyze the fats and to maintain the reaction materials in the liquid phase whereby refined fatty acids tend to accumulate in one phase, the impurities and the water and glycerine in at least one other phase, separating the phases and recovering the fatty acids.

7. A continuous process for the manufacture of fatty acids from fats which comprises comingling the fats with a solvent selected from the group consisting of normal pentane, iso pentane, normal hexane, iso hexane, normal heptane, iso heptane, and petroleum naphtha, subjecting the resulting product in the presence of water to hydrolyzing temperatures and pressures sufficiently high to maintain the water and solvent in the liquid phase and such that the fats are hydrolyzed into fatty acid and glycerine and the hydrocarbon forms two liquid phases, one of said phases containing light color fatty acids and the other of said phases containing color bodies, separating said phases and recovering the fatty acids.

8. A process according to claim 7 in which the hydrocarbon is petroleum naphtha.

9. A process according to claim 7 in which the hydrocarbon is heptane.

FELIX E. LACEY.
WILLIAM M. LEADERS.

REFERENCES CITED

The following references are of record in the file of this patent:

UNITED STATES PATENTS

| Number | Name | Date |
| --- | --- | --- |
| Re. 22,006 | Ittner | Jan. 13, 1942 |
| 167,607 | Fell | Sept. 14, 1875 |
| 1,967,319 | Moore et al. | July 24, 1934 |